(12) United States Patent
Blanc

(10) Patent No.: US 12,150,467 B2
(45) Date of Patent: Nov. 26, 2024

(54) TUNNEL FOR DRYING FRUIT AND VEGETABLES

(71) Applicant: RODA IBÉRICA, S.L., Alzira (ES)

(72) Inventor: Christophe Blanc, Alzira (ES)

(73) Assignee: RODA IBÉRICA, S.L., Alzira (ES)

( * ) Notice: Subject to any disclaimer, the term of this patent is extended or adjusted under 35 U.S.C. 154(b) by 606 days.

(21) Appl. No.: 17/601,168

(22) PCT Filed: Feb. 19, 2020

(86) PCT No.: PCT/ES2020/070119
§ 371 (c)(1),
(2) Date: Oct. 4, 2021

(87) PCT Pub. No.: WO2020/201593
PCT Pub. Date: Oct. 8, 2020

(65) Prior Publication Data
US 2022/0175011 A1    Jun. 9, 2022

(30) Foreign Application Priority Data
Apr. 5, 2019 (ES) ................ ES201930314

(51) Int. Cl.
*A23N 12/08*      (2006.01)
*F26B 15/12*      (2006.01)
*F26B 21/00*      (2006.01)

(52) U.S. Cl.
CPC ............ *A23N 12/08* (2013.01); *F26B 15/122* (2013.01); *F26B 21/004* (2013.01)

(58) Field of Classification Search
CPC ....... F26B 15/122; F26B 21/004; A23N 12/08
USPC ......................................... 34/236
See application file for complete search history.

(56) References Cited

U.S. PATENT DOCUMENTS

| 1,447,493 | A | | 3/1923 | Strawn | |
|---|---|---|---|---|---|
| 3,802,020 | A | * | 4/1974 | Stone | F23G 7/10 |
| | | | | | 15/4 |
| 4,291,472 | A | * | 9/1981 | Lewis | F26B 21/02 |
| | | | | | 34/212 |
| 4,352,249 | A | | 10/1982 | Rose | |
| 4,777,734 | A | | 10/1988 | Elferink | |
| 5,651,191 | A | | 7/1997 | Walunas et al. | |
| 5,832,627 | A | * | 11/1998 | Hiebert | F26B 15/122 |
| | | | | | 34/224 |
| 5,915,815 | A | * | 6/1999 | Moore | F26B 25/006 |
| | | | | | 34/79 |
| 6,023,852 | A | | 2/2000 | Mulligan et al. | |
| 6,233,841 | B1 | * | 5/2001 | Beach | F26B 19/005 |
| | | | | | 34/418 |

(Continued)

FOREIGN PATENT DOCUMENTS

| AU | 750910 B2 | 8/2002 |
|---|---|---|
| CN | 101995149 A | 3/2011 |

(Continued)

*Primary Examiner* — Stephen M Gravini
(74) *Attorney, Agent, or Firm* — The Webb Law Firm

(57) ABSTRACT

The present disclosure consists of a drying tunnel for fruits or vegetables which comprises an impulsion and heating chamber and a plenum, configured for receiving an outgoing hot air generated in the impulsion and heating chamber by the generator, so that the plenum comprises openings arranged in a staggered pattern, located on the lower surface thereof, with an opening density between 150 to 300 openings per square meter, wherein said openings are configured for expelling a distributed hot air from inside the plenum in a perpendicular way towards a conveyor system, configured for moving fruits and vegetables to be dried.

9 Claims, 4 Drawing Sheets

(56) References Cited

U.S. PATENT DOCUMENTS

| | | | |
|---|---|---|---|
| 9,883,693 B1 * | 2/2018 | Cradic | F26B 3/347 |
| 9,951,991 B2 * | 4/2018 | Biel | D06F 60/00 |
| 10,113,795 B2 * | 10/2018 | Hoffman, Jr. | F26B 15/12 |
| 10,788,265 B2 * | 9/2020 | Spangler | F26B 15/12 |
| 11,078,026 B2 * | 8/2021 | Carlsson | B65G 45/22 |
| D1,023,501 S * | 4/2024 | Bo | D34/29 |
| 2012/0168424 A1 | 7/2012 | Cai et al. | |
| 2014/0053424 A1 | 2/2014 | Schreiber et al. | |
| 2018/0231310 A1 | 8/2018 | Ojalainen | |
| 2022/0175011 A1 * | 6/2022 | Blanc | F26B 15/122 |

FOREIGN PATENT DOCUMENTS

| | | | | |
|---|---|---|---|---|
| CN | 203561164 U | 4/2014 | | |
| CN | 203837424 U | 9/2014 | | |
| CN | 206670294 U | 11/2017 | | |
| DE | 2502647 A1 | 7/1976 | | |
| EP | 3951298 A1 * | 2/2022 | | A23N 12/08 |
| ES | 8206159 A1 | 8/1982 | | |
| ES | 2785800 A1 * | 10/2020 | | A23N 12/08 |
| FR | 2461217 A1 | 1/1981 | | |
| GB | 526346 | 9/1940 | | |
| JP | S4869762 U | 9/1973 | | |
| JP | S5790569 A | 6/1982 | | |
| JP | 2002085034 A | 3/2002 | | |
| JP | 2005006612 A | 1/2005 | | |
| JP | 3722370 B2 | 11/2005 | | |
| KR | 101509904 B1 | 4/2015 | | |
| WO | 02093097 A1 | 11/2002 | | |
| WO | WO-2014031841 A1 * | 2/2014 | | A23L 3/40 |
| WO | WO-2020201593 A1 * | 10/2020 | | A23N 12/08 |

* cited by examiner

TUNNEL FOR DRYING FRUIT AND VEGETABLES

CROSS-REFERENCE TO RELATED APPLICATIONS

This application is the United States national phase of International Application No. PCT/ES2020/070119 filed Feb. 19, 2020, and claims priority to Spanish Patent Application No. P201930314 filed Apr. 5, 2019, the disclosures of which are hereby incorporated by reference in their entirety.

BACKGROUND OF THE INVENTION

Field of the Invention

In the industrial process of fruit treatment, two drying processes stand out, after washing and before the application of wax, known as the "pre-drying phase" and the second, after the application of wax, known as "drying phase" for preventing the fruit from sticking and making it difficult to handle, as well as preventing the appearance thereof from worsening.

The present invention relates to a large capacity drying tunnel for fruits, vegetables or similar, for drying said fruits in the steps subsequent to washing or waxing, improving the current technology used to date, expanding the work volume and the drying speed.

DESCRIPTION OF RELATED ART

In the current systems of existing drying tunnels for conventional use, the fruit moves entering through one of the ends thereof by means of a moving roller conveyor. Although this conveyance can be carried out in many ways, one of the most commonly used is that which comprises rollers as it enables the fruit to rotate and move at the same time. The wet fruit advances over them, in which a fluid stream of hot air is applied coming from a pressure generator, commonly located in the upper portion of the tunnel to favor the air flow and the outlet of the water that covers the surface of the fruit by means of gravity towards the outside.

The mechanical construction of the tunnel is designed so that the air flow is forced over the fruit along the entire path causing it to collide with the fruit, causing it to dry from the outlet by means of longitudinal grooves known as "air knives". The direction of the flow can have the same direction that the fruit follows or counterflow to catch it with an increasing temperature in the advance direction, depending on the manufacturer.

One of the drawbacks of the system is that the hot air tends to remain in the upper portion of the duct where it encounters less resistance to flow, so the tunnels are sized to ensure that the contact time between the fruit and the hot air is sufficient to achieve drying, the air outlet being very close to the fruit with a high enough speed but without altering the features of the product.

To increase the drying performance, some models have fans installed in the upper portions of the tunnels in order to accelerate the air flow, since it is greatly reduced as it approaches the end of the tunnel. However, a non-uniform flow is generated that does not dry all the pieces equally, receiving excessive amounts of hot air in some areas and insufficient flow in others, as well as requiring a higher consumption than required if the distribution were uniform.

In other cases, lateral fans are used in such a way that it is intended to suction air from the lower portion of the roller conveyor and drive it over the fruit, favoring a turbulent flow instead of a laminar flow in the areas close to the fan. The performance of this solution is low since the fans do not reach the full size of the tunnel width, leaving a drying difference between the fruit that passes through the center of the tunnel and that which passes through the sides.

The problem of the air flow slowing down along the tunnel being known, some drying tunnels comprise arrays of vertical or inclined fans from the middle of the duct onwards, depending on the direction of the fruit, wherein the speed and temperature of the flow have already decreased. Therefore, increasing the speed of the air against the fruit is achieved in addition to favoring the advance of the hot flow, increasing the performance of the installation.

Other portions of the mechanism with great relevance to take into account is that which works on air quality, especially in the procedure by means of which the drying air is heated. The most current systems use a heat pump with double exchange, first causing the air to pass through the cold exchanger at the end of the tunnel, drying the air that has been in contact with the fruit and then pass through the hot exchanger to raise the temperature and lower even more the relative humidity due to the dilation effect.

This system is more common in industrial dryers for rice and coffee beans, among others. Therefore, the main difference is that it works with air of low relative humidity regardless of the environmental conditions.

Several inventions stand out, such as the one included in Spanish Patent No. 8206159, which relates to a system for drying fruit in tunnels with the presence of 48 elongated nozzles that shoot the air generated in a fan directly and perpendicularly over the fruit.

As the nozzles are located longitudinally, regular drying is prevented from reaching all the tunnel elements, distributing the air unevenly through the fruits and vegetables. Furthermore, by having this arrangement, with an elongated open surface, spaces are generated through which the hot air is not directly received.

U.S. Pat. No. 1,447,493 discloses another fruit drying system which directs air towards a tank wherein it is discharged at high speed through openings in the lower face thereof towards the fruit that circulates on the conveyor belt. Said invention does not mention the type or cross section of these openings, nor the distribution thereof along the lower face, as in U.S. Pat. No. 4,777,734, which describes a tunnel that has outlet holes in the lower face thereof which expel air perpendicularly over items to be dried and International Patent No. WO02093097, which relates to a drying system which comprises two drying zones also perpendicular to the fruit that moves under the machine, the air outlets being longitudinal.

SUMMARY OF THE INVENTION

Knowing the background described, the present disclosure has been designed to solve the drawbacks of the state of the art, improving performance and ensuring that the same air mass can dry more fruit. In addition, the construction of the models detailed in the previous patents is simplified, improving the functional performance of the tunnel, enabling better productivity to be obtained during this treatment phase.

For this, the system has been designed in such a way that the hot air outlet for drying the fruits and vegetables is carried out by means of small circular or oval holes or nozzles which enable the amount of air in contact with the surface of the fruit skin to be increased, maintaining the thermodynamic conditions of the air throughout the entire tunnel and causing the velocity of the air to be as high as possible at the moment of impact against the fruit to favor the mechanical dragging of the water and at the same time lowering the atmospheric pressure in that area, thus favoring the vaporization of the water without damaging the fruits.

More specifically, the present disclosure consists of a drying tunnel for fruits or vegetables which comprises at least one impulsion and heating chamber, and a plenum configured for receiving an outgoing hot air generated in the impulsion and heating chamber by the aforementioned generator.

The tunnel plenum comprises holes which have a circular or oval cross section arranged in a staggered pattern, located on a flat lower surface of said plenum, with a hole density between 150 to 300 holes per square meter.

Said holes are configured for expelling the distributed hot air from inside the plenum in a perpendicular way towards a conveyor system which moves fruits and vegetables to be dried.

The distribution of the holes with a staggered pattern, on the lower surface of the plenum has been configured so that all portions of the conveyed element receive the hot air directly and perpendicularly, and they are dimensioned so that all the pressure energy turns into speed.

The plenum consists of an enclosed space wherein the air is distributed in the same way throughout the internal volume thereof. For this, said plenum has a decreasing rectangular cross section, as it moves away from the air inlet, for maintaining pressure conditions throughout the tunnel, from the beginning to the end of the transit of the piece of fruit throughout the process.

Thus, the plenum is configured in such a way that it releases hot air under the same pressure and temperature conditions throughout the entire movement of the fruit, achieving a more uniform flow distribution by means of the geometry of the plenum over all the holes in the tray.

In one embodiment, the impulsion and heating chamber comprises a turbine which generates high pressure air, and a heat generator which heats the air generated by the turbine.

In essence, the developed system functions by using the turbine as a hot air impulsion source over the plenum at constant pressure. The plenum releases the air through the lower face thereof by means of the matrix of holes or openings regularly located on said surface.

The temperature reached by the outgoing hot air from the impulsion and heating chamber that is received by the plenum is between 25 and 45° C., which favors an appropriate drying of the pieces, since at a lower temperature the complete drying of the pieces is not achieved and a temperature higher than the indicated range implies an unnecessary energy load.

The static pressure of the plenum, when the drying tunnel is in operation and receives the outgoing hot air from the impulsion and heating chamber, is between 300 and 800 Pa, which favors the appropriate air flow inside the tunnel and therefore optimal drying of the fruit pieces.

The outlet velocity of the distributed hot air through the holes from the plenum towards the fruit pieces is comprised between 20 m/s and 50 m/s due to the configuration adopted by the openings and the operating regimes of the turbine of the impulsion and heating chamber.

In one embodiment, the tunnel comprises at least one aspirator element configured for suctioning the distributed hot air expelled through the openings, and directing air suctioned by the aspirator through at least one lateral duct into the impulsion and heating chamber, generating a flow of hot air inside the tunnel, due to the depression generated, as well as a mechanical dragging of the water.

The aspirator suctions a percentage of the distributed hot air, approximately between 50 and 90% of said air, which had been previously expelled through the openings.

The suctioned air that is redirected to the impulsion and heating chamber is mixed with outside air, which is at a lower temperature and with lower humidity than the suctioned air, said outside air entering through a grid, the mixture of said air being used for reuse in the drying of the fruits.

The aforementioned conveyor system consists of a roller conveyor since, as mentioned in the background, it is a system that enables the correct movement of the pieces to be dried, as well as the rotation thereof, enabling the air jet from the openings to reach the entire surface of each piece.

As the air is released perpendicularly to the movement of the fruit, the amount of current in contact with the surface is considerably increased and the drying process is improved, by focusing the air directly towards the fruits.

In addition, by aspirating the distributed hot air that has slightly cooled in the drying phase, the hot air inlet through the holes is improved, due to the depression generated in the aspiration, which improves the mechanical dragging of the water and at the same time reduces the pressure in that area, thus favoring the vaporization of the water.

Therefore, the novelty of this system, in addition to the circular or oval arrangement of the air outlet openings, lies in the internal aerodynamics for improving performance both in the drying phase and in the pre-drying phase.

The productivity of a drying tunnel with this system improves two-fold with respect to those indicated in the background. In other words, a tunnel of the same size as a conventional one with this system can work with double the production, achieving good performance if the volume of heated air is compared with the amount of steam to be dislodged.

BRIEF DESCRIPTION OF THE DRAWINGS

To complement the description provided herein, and for the purpose of helping to make the features of the present disclosure more readily understandable, said description is accompanied by a set of drawings constituting an integral part of the same, which by way of illustration and not limitation represents the following.

DETAILED DESCRIPTION OF THE INVENTION

Figure 7:
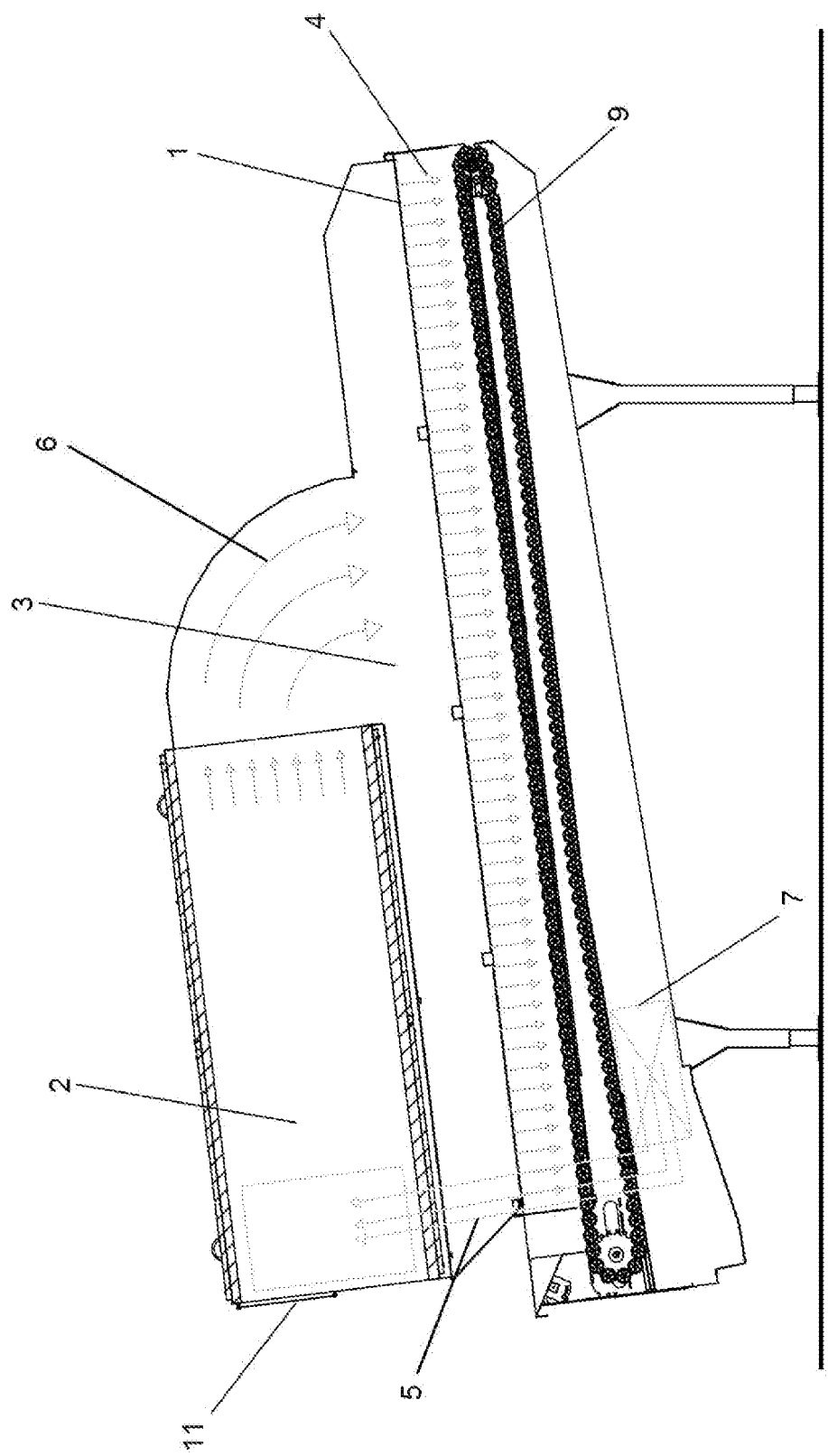
FIG. 7 shows a profile perspective of the complete drying tunnel with the arrows that simulate the air direction at each interval.

As can be seen in the figures, especially in FIG. 7, the tunnel for drying fruits and vegetables that is the object of the present disclosure is made up of an impulsion and heating chamber (2) which comprises a turbine and a heat generator, so that in this space an outgoing hot air current (6) is generated that enters a plenum (3) at constant pressure.

This plenum (3), in the shape of a rectangular duct, has a rectangular cross section that decreases along the length thereof, such that it enables the pressure conditions inside it to be maintained, a pressure between 300 and 800 Pa.

Figure 1:
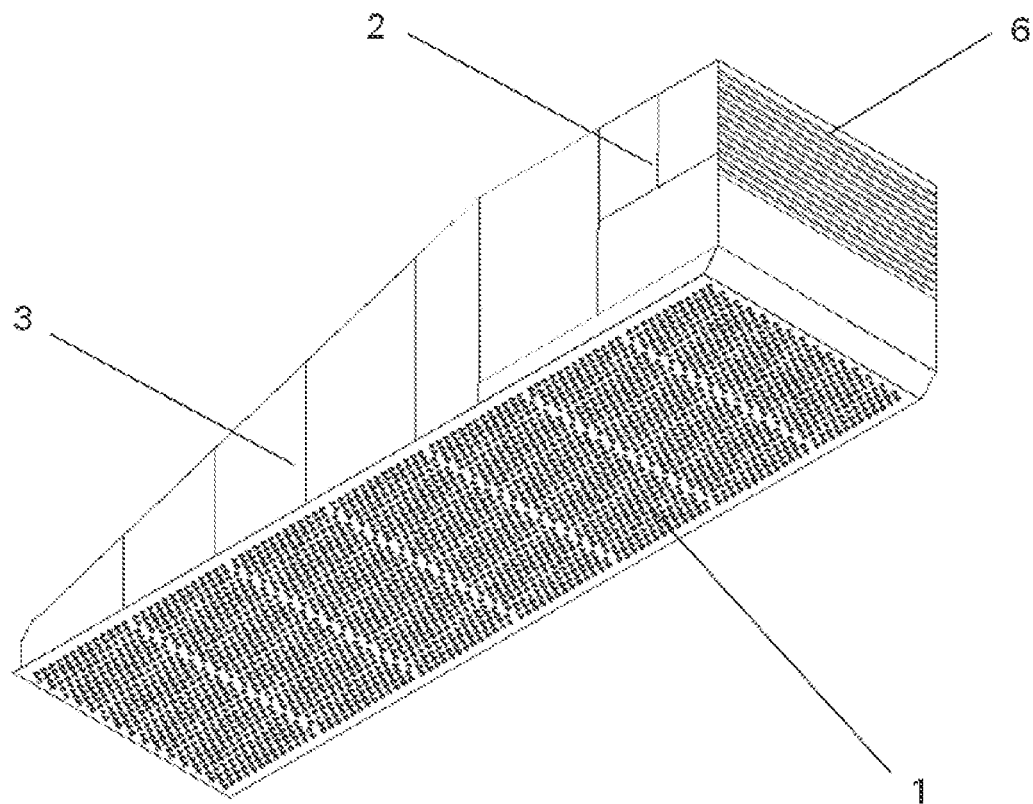
FIG. 1 shows an axonometric rear perspective of the fruit drying tunnel, without the conveyor system to be able to view the openings in the lower surface.
Figure 2:
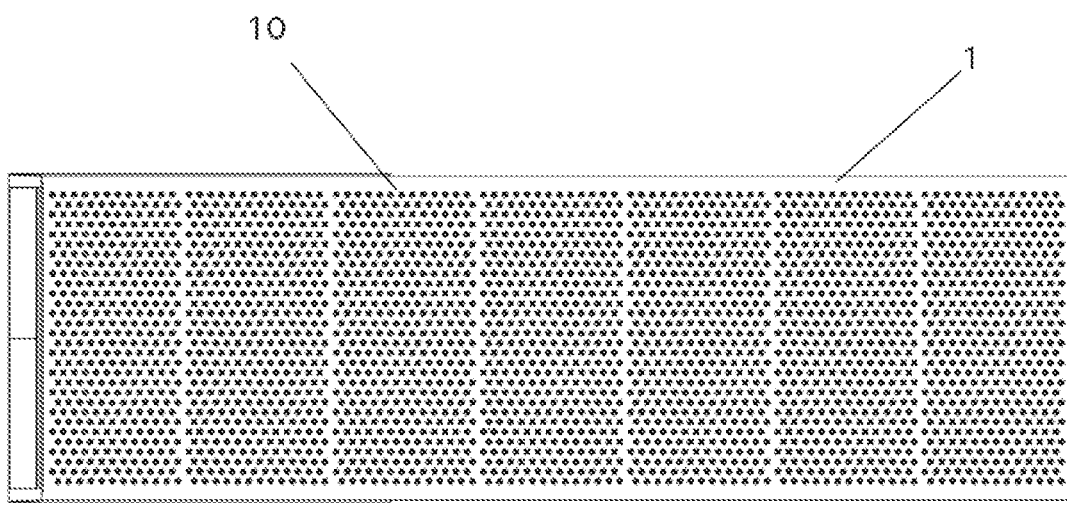
FIG. 2 shows a projection of the lower level of the drying duct wherein the density and location of the staggered openings through which the hot air comes out across the entire surface is shown.
Figure 3:
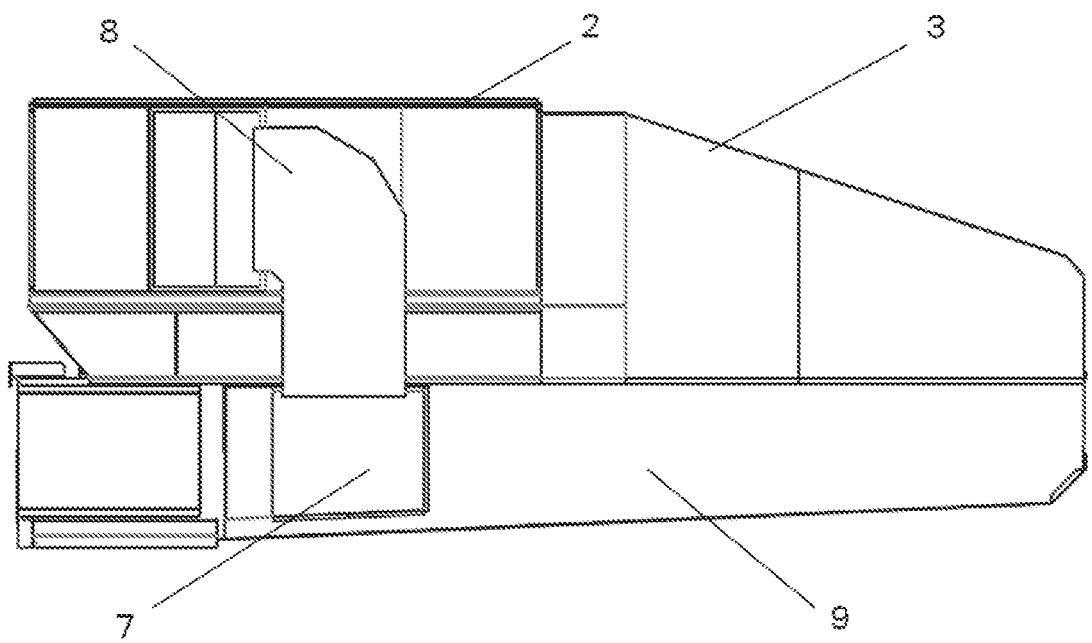
FIG. 3 shows an external projection of the profile of the drying tunnel together with the complete mechanism for moving the fruit, as well as the air recirculation ducts.
Figure 4:
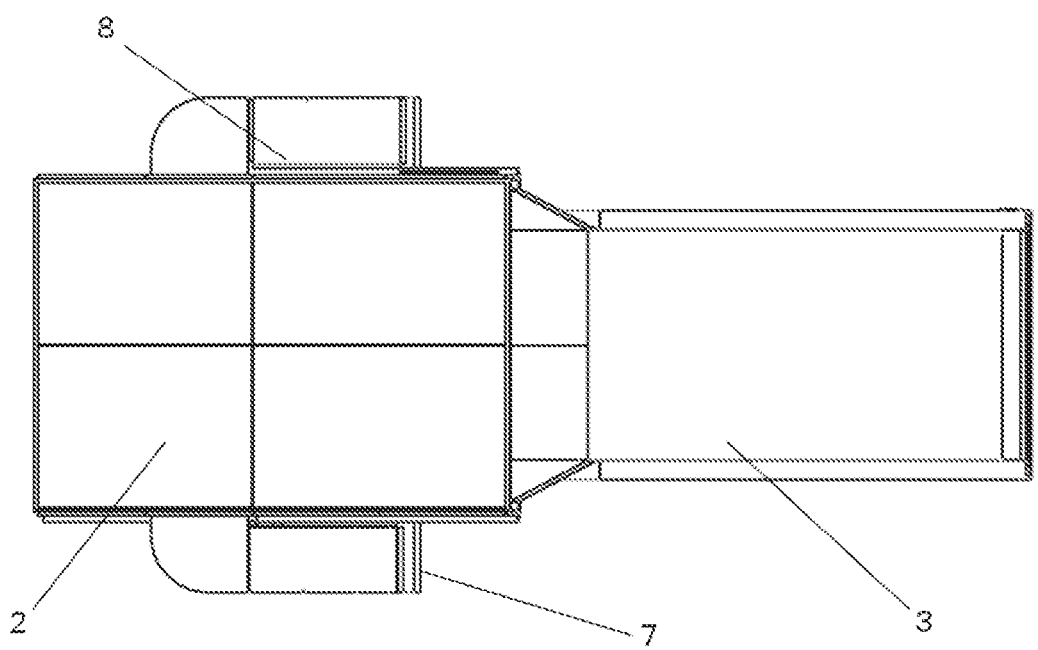
FIG. 4 shows a projection of the upper level of the entire drying tunnel, which enables the position of the recirculation ducts to be appreciated.
Figure 5:
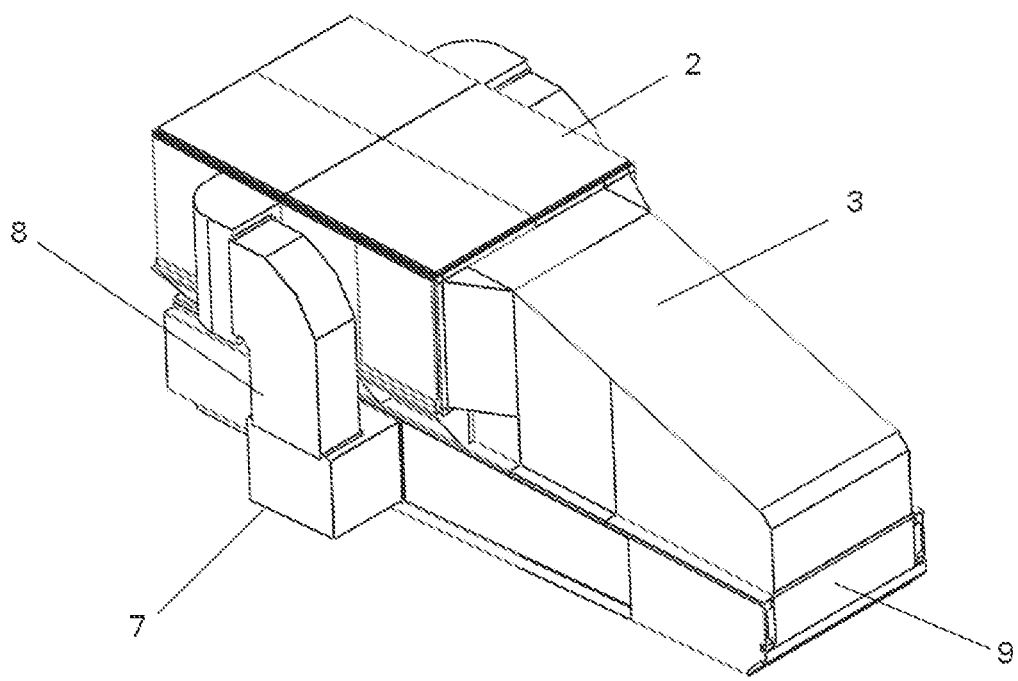
FIG. 5 shows an isometric perspective view of the entire tunnel.
Figure 6:
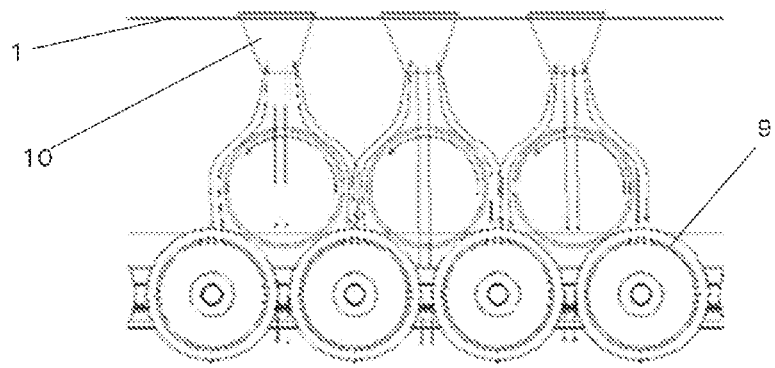
FIG. 6 shows a profile view of how the fruit is dried by expelling hot air through the openings towards the fruit.

As can be seen in FIG. 2, on the lower surface (1) of the plenum there are circular openings (10) in a distribution of approximately 300 openings/m² which enable the outlet of distributed hot air (4) towards a roller-based conveyor system (9), wherein fruits or vegetables that are wet from previous cleaning or waxing processes, move in order to be dried.

This distributed hot air (4), expelled through the openings (10) of the lower base (1) impacts directly on the surface of the fruits or elements present in the conveyor system (9) in a perpendicular way, such that, due to the speed and temperature thereof, it dries them during the period in which they are moving through the tunnel.

As the openings (10) have a staggered arrangement throughout the expelling surface (1), all the portions of the fruits present in the conveyor system receive the hot air flow, from the moment they enter the tunnel until they come out, at a constant speed, in an efficient process wherein the elements to be dried are not damaged.

The distributed hot air (4) used in the drying process is suctioned by two aspirators (7) located on the sides of an initial section of the conveyor system (9), under the impulsion and heating chamber (2), improving the air inlet through the holes (10) due to the depression created in the aspiration and dragging of the water that the fruit carries on the surface.

These aspirators (7) generate a suctioned air flow (5) which, despite having dried the humidity present in the tunnel, still maintains a higher temperature than the outside, so it is recirculated through two ducts (8), one for each aspirator (7), towards the impulsion and heating chamber (2) in order to be reused again, requiring less energy from the heat generator in order to increase the temperature of the outgoing hot air (6).

To reduce the humidity that this suctioned air flow (5) may have, it is mixed with air from the outside that comes from a grid (11) located at the rear portion of the impulsion and heating chamber (2), providing the air mixture with optimal conditions for drying that are controlled in order to regulate the heating degree.

The invention claimed is:

1. A drying tunnel for fruits or vegetables comprising:
   an impulsion and heating chamber; and
   a plenum, configured for receiving an outgoing hot air generated in the impulsion and heating chamber,
   wherein the plenum comprises:
   openings, with a cross-section shape selected from the group consisting of circular and oval, arranged in a staggered pattern, located on a lower surface of the plenum, with an opening density between 150 to 300 openings per square meter,
   wherein the openings are configured for expelling a distributed hot air from inside the plenum in a perpendicular way towards a conveyor system, configured for moving fruits and vegetables to be dried,
   wherein the plenum comprises a rectangular cross-section decreasing along a length thereof, as the rectangular cross-section moves away from an inlet of an outgoing hot air from the impulsion and heating chamber, and
   wherein the decreasing rectangular cross-section is configured for maintaining pressure conditions inside and releasing distributed hot air under a same pressure and temperature conditions throughout an entire conveyor system, achieving a uniform flow distribution over all the openings by means of a geometry of the plenum.

2. The drying tunnel for fruits and vegetables according to claim 1, wherein the impulsion and heating chamber comprises a turbine which generates air at constant pressure and a heat generator that heats the air generated by the turbine.

3. The drying tunnel for fruits and vegetables according to claim 1, wherein the outgoing hot air from the impulsion and heating chamber received by the plenum has a temperature between 25 and 45° C.

4. The drying tunnel for fruits and vegetables according to claim 1, wherein the plenum has a static pressure between 300 and 800 Pa when the plenum receives the outgoing hot air from the impulsion and heating chamber.

5. The drying tunnel for fruits and vegetables according to claim 1, wherein a distributed hot air expelled through the openings has an outlet velocity between 20 m/s and 50 m/s.

6. The drying tunnel for fruits and vegetables according to claim 1 further comprising at least one aspirator configured for suctioning a distributed hot air expelled through the openings, and directing suctioned air by the aspirator through at least one lateral duct into the impulsion and heating chamber, generating a flow of hot air inside the tunnel, due to a depression generated, as well as a mechanical dragging of water.

7. The drying tunnel for fruits and vegetables according to claim 6, wherein the suctioned air by the aspirator comprises a percentage between 50 and 90% of the distributed hot air expelled through the openings.

8. The drying tunnel for fruits and vegetables according to claim 6, wherein the suctioned air, which is redirected to the impulsion and heating chamber, is mixed with air external, which is at a lower temperature than the suctioned air, the external air entering through a grid, a mixture of the air being used for reuse in drying the fruits.

9. The drying tunnel for fruits and vegetables according to claim 1, wherein the conveyor system consists of a roller conveyor.

* * * * *